United States Patent
Don et al.

(10) Patent No.: US 12,470,386 B2
(45) Date of Patent: Nov. 11, 2025

(54) MULTI-FACTOR SECURITY IN FIBER CHANNEL PROTOCOL

(71) Applicant: Dell Products, L.P., Round Rock, TX (US)

(72) Inventors: Arieh Don, Newton, MA (US); Efi Levi, Beer Sheba (IL); Lior Benisty, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 18/301,840

(22) Filed: Apr. 17, 2023

(65) Prior Publication Data

US 2024/0348445 A1   Oct. 17, 2024

(51) Int. Cl.
*H04L 9/32*    (2006.01)
*G06F 21/62*   (2013.01)

(52) U.S. Cl.
CPC ........ *H04L 9/3213* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 11,171,950 B1* | 11/2021 | Zhuravlev | H04L 67/141 |
| 11,526,339 B1* | 12/2022 | Kruayatidee | H04L 63/0853 |
| 2022/0329584 A1* | 10/2022 | Sharma | H04L 9/3263 |

* cited by examiner

*Primary Examiner* — Brandon Hoffman
(74) *Attorney, Agent, or Firm* — Amin, Turocy & Watson, LLP

(57) ABSTRACT

An identifier, such as a worldwide name, corresponding to a host computing device, or corresponding to a host bus adapter corresponding to the host computing device, may be transmitted to a storage array to configure the storage array to be accessed by the host computing device. The host may request a token from the array. The host may embed the token into a token block of a command message that is transmitted to the storage array requesting access to the array. Before performing an action corresponding to the command message, the storage array may verify that the token is a valid token and thus that the host computing device that transmitted the command message is a host computing device that has been authorized to access the storage array. If the storage array determines that the token is valid the storage array may perform an action corresponding to the command message.

20 Claims, 10 Drawing Sheets

800

A storage array, comprising: a processor configured to: receive, from a management computing component, an authorization message, corresponding to a host computing device, indicative of the host computing device being authorized to access the storage array
805 receive, from the host computing device via a host bus adapter corresponding to the host computing device, an authentication request command
810 responsive to the authentication request command, generate authentication information
815 transmit, to the host computing device, an authentication message comprising the authentication information
820 receive, from the host computing device via the host bus adapter, a command message comprising a payload and the authentication information
825 determine that the authentication information corresponding to the command message is the same as the authentication information transmitted in the authentication message to result in the payload being an authenticated payload
830 based on the payload being determined to be the authenticated payload, perform an act according to the authenticated payload
835

FIG. 8

MULTI-FACTOR SECURITY IN FIBER CHANNEL PROTOCOL

BACKGROUND

The term 'cloud' may refer to a set, group, collection, or other plurality of computing resources, components, services, instances, collections, application, and the like that may be accessed by a computing resource, typically via a communication network (a communication network may also be referred to as a cloud). The term 'cloud' is typically used in reference to the computing resources without referencing specific items them make up the cloud resources when discussing computing functionality from the perspective of a computing resource that may make use of the functionality.

A cloud computing service provider may make available various computing resources, for example, software as a service, virtual machines, storage, bare metal computing hardware, or even a complete enterprise's infrastructure and development platforms, over a communication network. A cloud services provider may make a public cloud computing resource available to users over a publicly accessible network, such as the Internet. A private cloud computing resource is typically available or accessible only by a given customer, such as an enterprise and its employees. Computing resources may be provided from an enterprise's own on-premises data center or from a data center operated by an independent (e.g., independent from the enterprise customer) cloud services provider. A hybrid cloud may connect an organization's private cloud services and resources of public clouds into an infrastructure that facilitates the organization's applications and workloads in a manner that balances the maximizing of performance and the minimizing of costs across public and private cloud computing resources.

Cloud providers, whether providers of public or private computing resources, may use clustering of servers. A server cluster typically comprises servers that share a single Internet Protocol ("IP") address. Clustering enhances data protection typically, availability, load balancing, and scalability. A server associated with a cluster may be referred to as a node, which may comprise storage components such as hard drives or solid state drives, random access memory, ("RAM"), and central processing unit ("CPU") resources.

Data storage computer systems or components can facilitate the storage and manipulation of data by a variety of different network equipment. Data may be stored on a network storage component, which may be referred to as a storage or a storage array, and which may comprise a hard drive, a magnetic media drive, a solid-state drive, a memory, and the like. Manipulation may refer to one or more actions performed to a storage unit, such as a file, or files, which actions may comprise reading, writing, copying, moving, deleting, and the like.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example embodiment method may comprise receiving, by a storage array comprising a processor, an authorization message that authorizes communication by the storage array with a host computing device via a device interface data transfer protocol. The method may comprise receiving, by the storage array from the host computing device, an authentication token request command, or an authentication token request message. Responsive to the authentication token request command, the method may further comprise generating, by the storage array, an authentication token and transmitting, by the storage array to the host computing device, the authentication token. The method may further comprise receiving, by the storage array from the host computing device, a command information unit comprising a payload, such as Command Descriptor Block ("CDB") command information, and an authentication token block. The method may further comprise determining, by the storage array, that the authentication token block of the command information unit comprises the authentication token to result in the payload (e.g., command) of the command information unit being a determined authenticated payload, and operating, by the storage array, according to the determined authenticated payload. Operating according to the determined authenticated payload may comprise performing a read command, a write command, or another data manipulation action.

In an embodiment, the device interface data transfer protocol may be Small Computer System Interface protocol. In an embodiment, the device interface data transfer protocol may be Fibre Channel Protocol. In an embodiment, the authentication token may be a Json Web Token. In an embodiment, the determined authenticated payload may comprise a command, and wherein the operating according to the determined authenticated payload comprises performing an action corresponding to the command. In an embodiment, the authorization message is a result of a logical unit number masking process. In an embodiment, the authorization message may be received from a management computing component, and wherein the management computing component may be configured to manage the storage array and a host bus adapter, corresponding to the host computing device, via a private computing network. In an embodiment, the authorization message may be generated by, facilitated by, transmitted by, or received from, a host management console, which may be a component of the management computing component.

In an embodiment, the authentication token may comprise an expiration indication indicative of an expiration of the authentication token. The method may further comprise analyzing, by the storage array, the expiration with respect to a current time and determining, by the storage array, that the current time is later than the expiration to result in a determined expired authentication token. The operating according to the determined authenticated payload may comprise transmitting a notification indication indicative to the host computing device to transmit to the storage array a new authentication token request command requesting a new authentication token. The host computing device may comprise a host bus adapter, and the authorization message may comprise a worldwide name corresponding to the host bus adapter.

The command information unit may comprise an authentication token block indication indicative of the command information unit comprising the authentication token block.

The authentication token block indication may comprise at least one bit of a vendor-specific portion of the command information unit.

In an example embodiment, a storage array may comprise a processor configured to receive, from a management computing component, an authorization message, corresponding to a host computing device, indicative of the host computing device being authorized to access the storage array. The processor may be further configured to receive, from the host computing device via a host bus adapter corresponding to the host computing device, an authentication request command, and responsive to the authentication request command, generate authentication information. The processor may be further configured to transmit, to the host computing device, an authentication message comprising the authentication information. The processor may be further configured to receive, from the host computing device via the host bus adapter, a command message comprising a payload and the authentication information, determine that the authentication information corresponding to the command message is the same as the authentication information transmitted in the authentication message to result in the payload being an authenticated payload, and based on the payload being determined to be the authenticated payload, perform an act according to the authenticated payload.

In an embodiment, the authenticated payload may comprise a command. Performance of the act according to the authenticated payload may comprise performing an action corresponding to the command. In an embodiment, the payload comprises an authentication information indication indicative of the payload may comprise the authentication information. The authentication information indication may comprise at least one bit of a vendor-specific portion of the command message.

In another example embodiment, a non-transitory machine-readable medium may comprise executable instructions that, when executed by a processor of a storage array, facilitate performance of operations, comprising receiving a host authorization message, corresponding to a host computing device, indicative of the host computing device being authorized to access the storage array. The host authorization message may be generated by, or transmitted to the storage array by, a host management console.

The operations may further comprise receiving, from the host computing device, an authentication token request command, and responsive to the authentication token request command, generating an authentication token. The operations may further comprise transmitting, to the host computing device, the authentication token. The operations may further comprise receiving, from the host computing device, a command information unit comprising payload data and an authentication token in an authentication portion of the command information unit, and determining, that the authentication portion of the command information unit comprises the authentication token to result in the payload data of the command information unit being determined to be authenticated payload data. The operations may further comprise operating according to the authenticated payload data.

The command information unit may comprise an authentication information indication indicative of the command information unit comprising the authentication token, and wherein the authentication information indication comprises at least one bit of a designated portion of the command information unit. The management computing component may correspond to a computing network that comprises the storage array. The management computing component may comprise a management console.

The authentication token may comprise an expiration indication indicative of an expiration of the authentication token. The operations may further comprise analyzing the expiration with respect to a current time to result in an analyzed expiration, and determining, based on the analyzed expiration, that the authentication token has expired. The operating according to the authenticated payload data may comprises transmitting a reauthentication indication indicative to the host computing device to transmit to the storage array a new authentication token request command requesting a new authentication token.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates an exemplary storage array embodiment.

DETAILED DESCRIPTION

Generally speaking, one or more embodiments described herein can facilitate monitoring file sharing commands between network equipment to identify adverse conditions. One or more embodiments can use different approaches to, without adversely affecting system performance, detect adverse conditions that can occur when networked equipment uses resource sharing communications (e.g., commands) to alter data on data storage equipment. Monitoring and analyzing commands generated for data manipulation can, in one or more embodiments, result in the detection of malware before damage, such as unauthorized appropriation of data stored to a data store occurs. A data store, such as a hard drive, a magnetic disc drive, a solid-state drive, a memory, and the like, may be referred to as a storage, and may be implemented as a storage that is accessible to multiple computing device. A storage may be a cloud storage that is accessible by multiple computing devices via a network.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
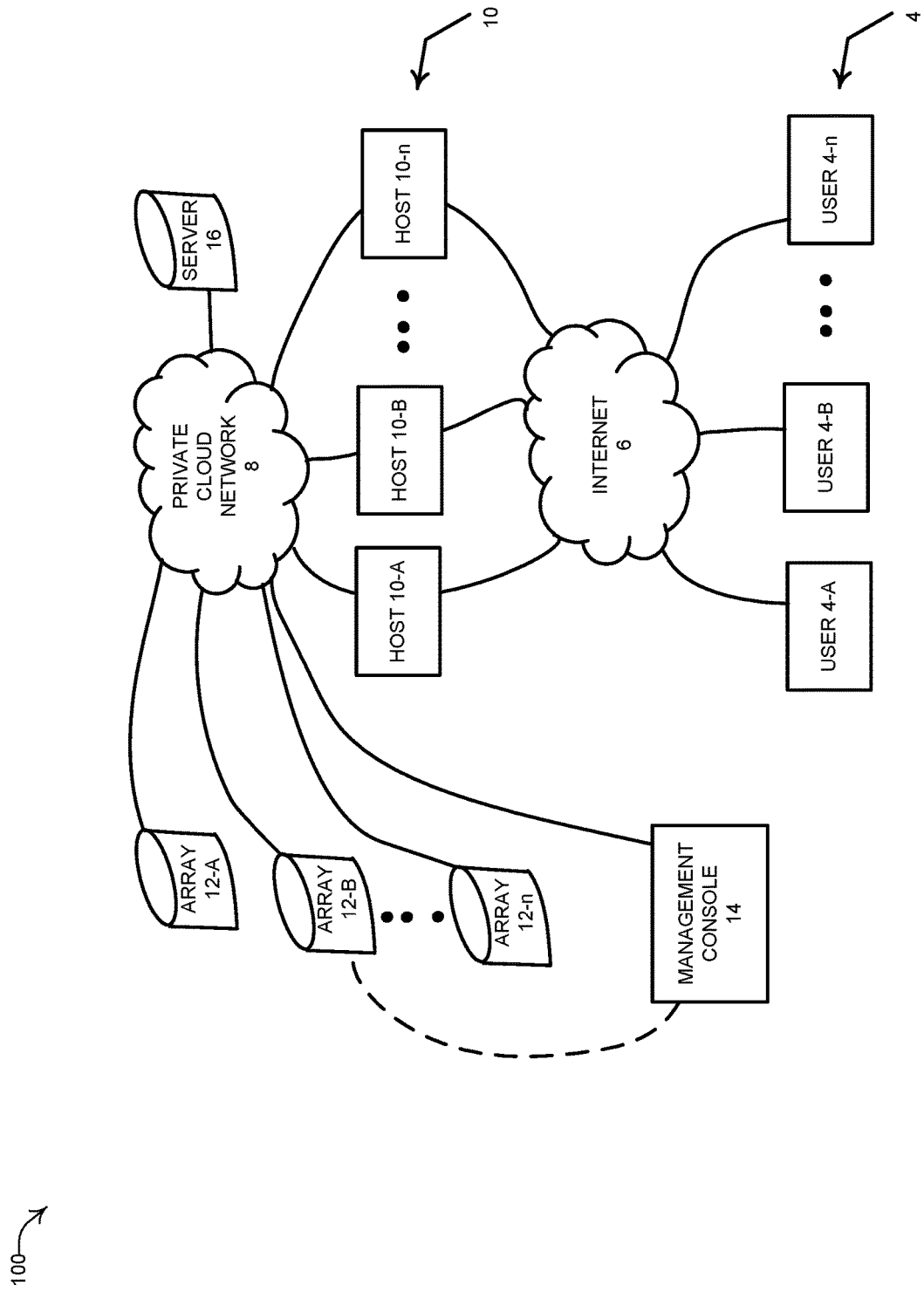
FIG. 1 illustrates an example cloud computing system network environment.

FIG. 1 illustrates a diagram of an example network system 100 that comprises user device 4A, 4B . . . 4n coupled with the Internet 6. User devices 4 may access one or more host computing systems 10A, 10B . . . 10n, which may access storage arrays 12A, 12B, 12n. Private cloud computing system 8 may be referred to as a private cloud or a private cloud network. User devices 4A, 4B . . . 4n may be coupled with private cloud 8 instead of the Internet 6. A user device 4A, 4B . . . 4n, may access a host computing system 10A, 10B, . . . 10n and may cause manipulation of data stored on one or more volumes that may make up one or more storage arrays 12A, 12B . . . 12n. A management console, which may be accessed by a user device 4 using credentials configured to permit the user device to access the management console, may be used to configure functionality corresponding to one or more arrays 12A, 12B, . . . 12n.

Figure 2:
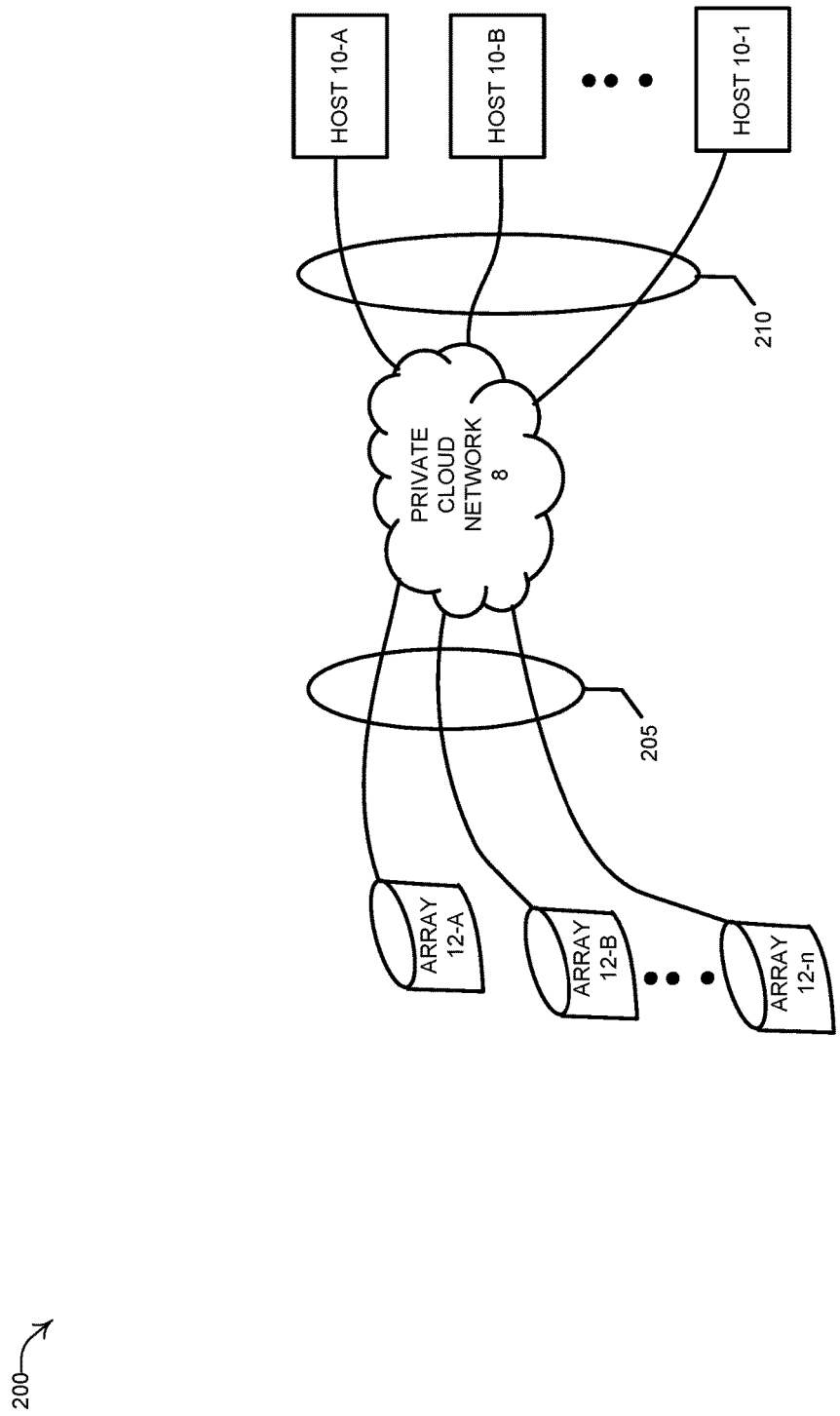
FIG. 2 illustrates a diagram of an example computing system network comprising storage arrays connected to components in the network via fiber cables.
Figure 3:
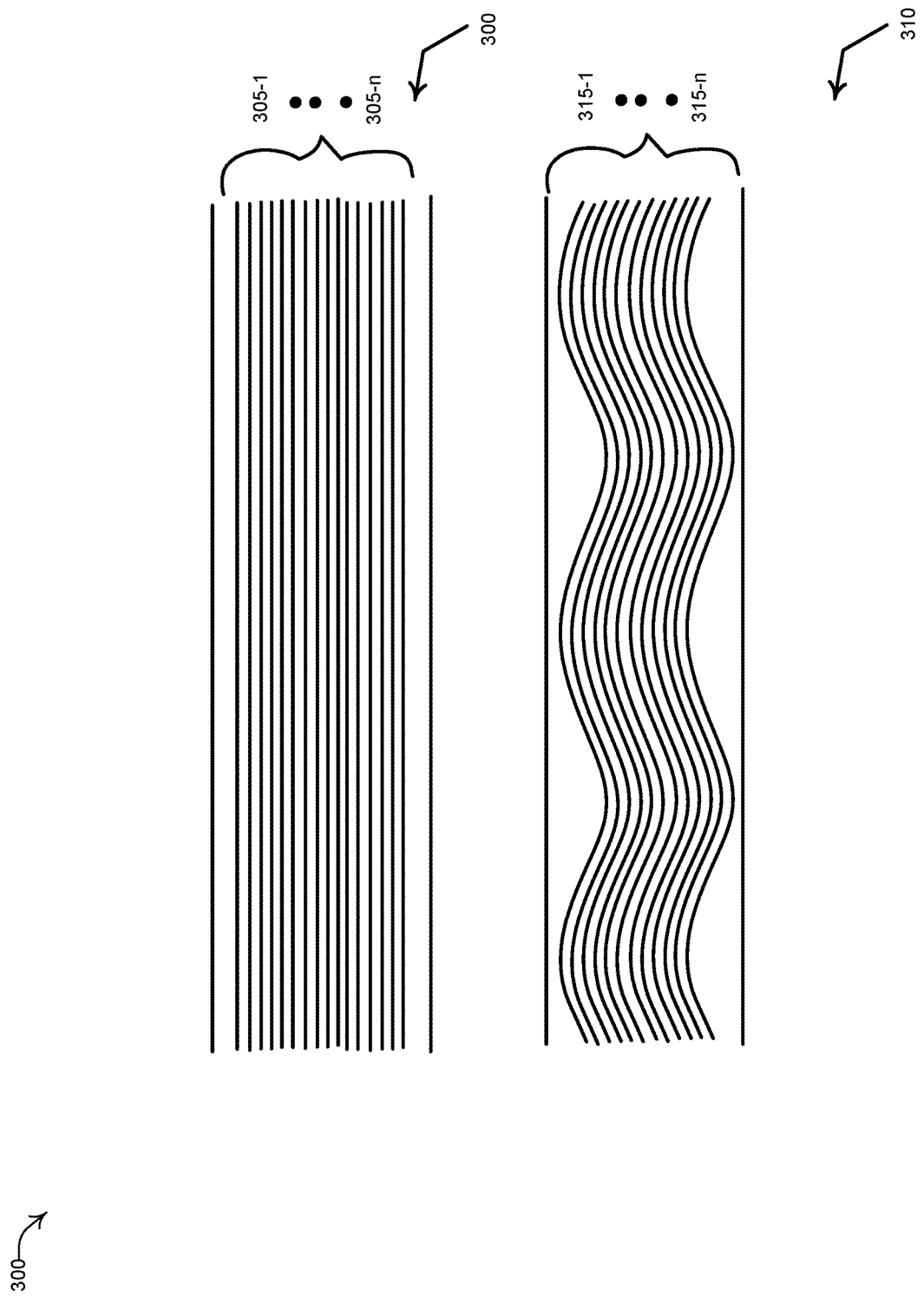
FIG. 3 illustrates a cable having multiple electrical conductors and a cable having a single fiber carrying multiple wavelengths.

As shown in system 200 of FIG. 2, a storage array 12A, 12B, . . . 12n may communicate with host computing systems 10A. 10B . . . 10n using interface protocol commands of an interface data transfer protocol, such as, for example, Small Computer System Interface ("SCSI") commands. A SCSI command may be transmitted via a command descriptor block ("CDB"). The interface data transfer protocol may be Fibre Channel Protocol ("FCP"), which may use a similar command set as the SCSI protocol. An FCP command may be adapted for use with computing devices that are connected via a fiber optic fiber 310 or that are connected via electrical conductors of an electrical cable 300 as shown in FIG. 3. Electrical cable 300 may comprise a multi-conductor ribbon cable. An FCP command may be transmitted via different light wavelengths 315-1 . . . 315-n in fiber cable 310 instead of being transmitted by different electrical conductors 305-1 . . . 305-n of electrical cable 300. A host computing system 10 shown in FIG. 1 may run management software, for example Unisphere® software offered by Dell Inc., which software may facilitate management console 14 shown in FIG. 1. Management console 14 may be facilitated by one or more components that may be part of a suite of cloud computing management system services, such as APEX® system services offered by Dell Inc.

A SCSI command, or a FCP command, may be a non-data command (an "N" command), a command to write data from an initiator device to a target device (a "W" command), a command to read data from a target device (an "R" command), or a bidirectional command (a "B" command). A drive, or volume of a drive, of a storage array 12 may comprise logical blocks that may be addressed by a Logical Block Address ("LBA"), which may comprise 512 bytes, or which may be 512 bytes in size. of storage. Data may be transmitted via SCSI messages in data messages comprising 512-byte data blocks.

In embodiments, an array 12 may comprise a processor and a storage device as one or more hard disk drives or one or more solid state drives. According to multiple embodiments, an array 12 can further comprise memory that can store one or more computer and/or machine readable, writable, and/or executable components and/or instructions that, when executed by a processor, can facilitate performance of operations defined by the executable component(s) and/or instruction(s). In embodiments, a memory of an array 12 can store one or more computer and/or machine readable, writable, and/or executable components and/or instructions, which can, when executed by a processor of the array, facilitate performance of operations defined by the executable component, or other components described or suggested by different embodiments described herein, that can improve the operation of system 200 shown in FIG. 2. A reference made herein to an array, or to a storage, may comprise a reference to a storage array 12. Links 205 between one or more storage arrays 12 and private cloud 8 may comprise one or more light fibers or one or more electrical conductors. Links 210 between one or more host computing devices 10 and private cloud 8 may comprise one or more light fibers or one or more electrical conductors. Links 205 and links 210 may be the same links (e.g., a fiber link or an electrical link may connect a storage array 12 and a host computing device 10).

Existing/conventional authentication and authorization techniques related to SCSI and FCP communication between computing devices may comprise token creation at an authentication server 16 (e.g., a corporate information technology authentication server that may be operated by an operator of network 8). Using conventional techniques, to establish a trusted link an endpoint device, (e.g., a user device 4 or a hosting computing device 10 shown in FIG. 1) may execute an application to authenticate with server 16 to confirm that the endpoint device has permission to log in and access a storage array 12. Authentication server 16 may generate a random token with an expiration date, for example, a Json Web Token ("JWT"), and send the token to the endpoint device being used to login to access an array 12. The endpoint device may add the token in a request to server 16 (e.g., in an authorization header), and if the server validates the signature of the token, the server may authenticate the request (e.g., a request to manipulate an array 12.

Many host computing devices 10 (e.g., thousands of host computing devices 10) may be able to access a storage array 12. Hosts 10 may communicate with an array 12 according to a communication protocol, such as SCSI over FCP, SCSI over Ethernet ("iSCSI"), Non-volatile Memory Express ("NVMe") over FCP, NVMe over Transmission Control Protocol, and the like. Some protocols may facilitate a one-time security token being used when a host 10 logs in to an array 12, for example Challenge Handshake Authentication Protocol ("CHAP") in iSCSI. However, other protocols for example, SCSI over FCP, NVMe over FCP do not facilitate security. Existing protocols such as SCSI or NVMe do not support embedding secret information dedicated to security, such as a token, via bits of command message (e.g., a SCSI CDB message) dedicated for security.

Figure 4:
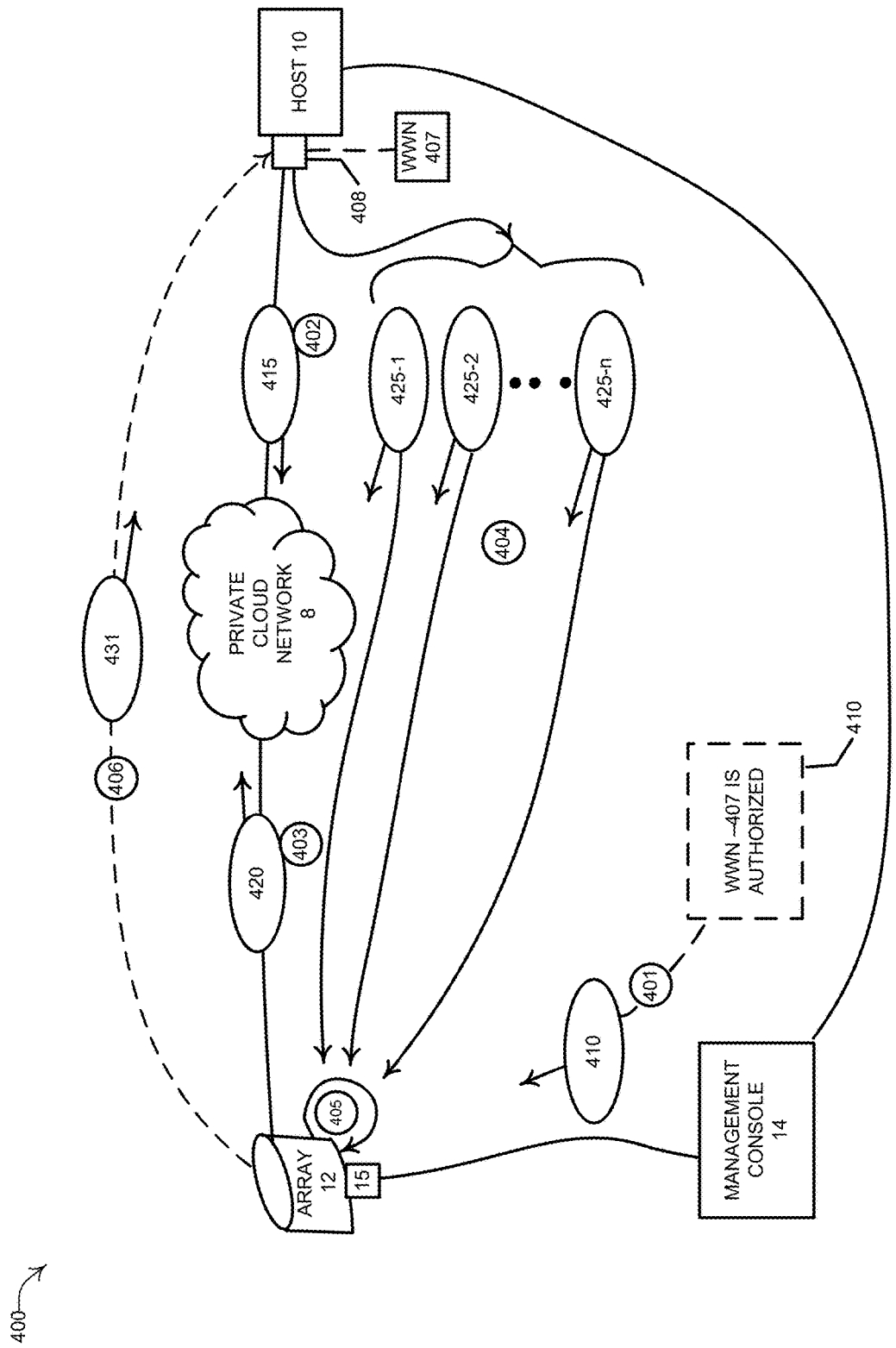
FIG. 4 illustrates an example computing system to embed a token in a fibre channel protocol data unit.

Turning now to FIG. 4, the figure illustrates a computing network environment 400 in which a host computing device 10 may communicate with a storage array 12. Host computing device 10 storage array 12 may be part of private cloud network 8. Host computing device 10 may comprise, or correspond to, a host bus adapter ("HBA") 408. An HBA in a SCSI protocol environment may be thought of as being similar to a Network Interface Card in an Internet protocol environment. HBA 408 may correspond to, or be associated with, a worldwide name 407 that is unique to, and that may uniquely identify, HBA 408. A worldwide name may be a unique number, a unique name, or other unique value that is associated with, or corresponds to, HBA 408. At act 401, management console 14 may generate and transmit, or facilitate generating or transmitting, to storage array 12 an authorization message 410 that comprises worldwide name 407. Authorization message 410 may be indicative to storage array 12 that host bus adapter 408 corresponding to worldwide name 407 is authorized to communicate with, or send commands to, port 15 corresponding to the storage array, or that HBA 408 is otherwise authorized to manipulate storage array 12. Such an initial authenticating setup of HBA 408 being authorized to access storage array 12, or port 15, may be referred to as 'masking.'

After initial masking at act 401, array 12 may be configured to respond to, and carry out, commands that are received that purport to have originated at host 10. However, array 12 may not be able to distinguish whether a command, for example in a CDB, received from host 10 was transmitted via HBA 408 or whether the command originated from a computing device that is masquerading as HBA 408 (e.g., an unauthorized computing device may be attempting to 'spoof' the unique identity of HBA 408). Therefore, according to conventional authentication techniques, once masking is done array 12 cannot verify that a command purporting to have been transmitted by HBA 408 was in fact transmitted by HBA 408.

Embodiments disclosed herein may use a novel authentication mechanism to authenticate connectivity between host computing device 10 and storage array 12 such that every command transmitted from the host computing device to the array may be authenticated by the storage array without involvement of an authentication server, such as server 16 described in reference to FIG. 1.

Continuing with description of FIG. 4, a token may be embedded in each data manipulation command, such as a read or a write command, sent from host computing device 10 to storage array 12 via a CDB. The token may facilitate storage array 12 in validating that a command conveyed by a CDB message was sent from the approved host computing device 10 (approved via masking), corresponding to HBA adapter 408, or corresponding to an application being executed by the host computing device. Instead of using a separate authentication server, using embodiments disclosed herein array 12 may function as an authentication server (e.g., the array may generate and validate authentication information such as a JWT), and host computing device 10 (which may be a client relative to array 12 acting as an authentication server) may add the authentication information to every command message sent to the array.

Thus, masking at act 401 provides a first authentication factor-management console 14 may generate or transmit, or cause to be generated or transmitted, authentication information 410 configuring port 15 of array 12 to communicate with HBA 408 according to WWN 407. Storage array 12 may be configured to accept communication from HBA 408 directed one or more volumes of storage 12 via array port 15.

After masking at act 401, in an embodiment, a second authentication level may be facilitated by host computing device 10 sending a vendor-unique command, for example, a command that is not SCSI-protocol specified but that may be a new command that is unique to a manufacturer of storage array 12. Typically, a storage array may be configured to recognize or respond to multiple manufacturer-specific commands, and at least one of such commands may be used as a token request message transmitted from host computing device 10 at act 402. In response to receiving token request 415, storage array 12 may generate a token, for example a JWT, which may be generated with an expiration date, and forward the token 420 to the host computing device at act 403. Thereafter, each command in a CDB message 425A, 425B, 425n transmitted at act 404 from host computing device 10 to storage array 12 may contain the JWT token in a new first block of the CBD. Thus, a size of a SCSI command message 425, or FCP command message, may be increased by one block to include token 420 transmitted at act 403.

At act 405, array 12 may receive a command 425 and determine whether the command 425 comprises the token 420. If a command 425 is determined at act 405 to comprise token 420 that is still valid (e.g., the token has not expired) storage array 12 may perform whatever command may have been transmitted in command 425. If array 12 determines at act 405 that a received command 425 does not contain a valid token 420, the storage array 12 may transmit at act 406 an alert message 431 to be indicative to host computing device 10 that the received command did not contain a valid token and that the host computing device may transmit a new token request message 415 requesting a new token 420 to facilitate implementing the rejected command.

In an example, host computing 10 may read from array 12 a public key corresponding to the array, and a string, for example, "Array SN 1234" (e.g., an identifier of array 12 such as a manufacturer-specific identifier). Alternatively, host computing device 10 may retrieve the key or the string from management console 14, which may be an entity trusted by the host computing device. An application running on host device 10 may use the key corresponding to array 12 to encrypt the string/identifier in conjunction with information corresponding to the host device that may have been configured to, or configured in, array 12 (e.g., WWN 407 that may have been written to, or stored to, array 12 during masking). Instead of encrypting the string corresponding to array 12 in conjunction with WWN 407, the application running on device 10 may encrypt the string corresponding to array 12 in conjunction with other information, such as an application license number.

Host 10 may then transmit the information encrypted using the key corresponding to array 12 in the first block of a command message 425. Array 12 may receive a command message 425, decrypt the command message, and determine whether the information transmitted in the first block of the command message is indicative of the command message having been transmitted by a configured authorized device using a valid key corresponding to the array (e.g., information in the first block is indicative that authorized HBA 408 read the string from array 12) to determine that the command message 425 is a valid command message. Array 12 may accept a valid input/output command, for example a write or a read command, and may perform the command embedded in the command message.

In an embodiment, array 12 may perform a validity check of a received command message 425 only randomly instead of for every received command message to improve array performance (e.g., less processor resources are used to randomly check messages 425 instead of every message. 425.) Storage array 12 may receive a command message 425, extract the JWT token information transmitted in the first block of a command message 425 and verify the token. Storage array 12 may reject a command message 425 with an expired/invalid token transmitted in a new block of CDB message and may, at act 406, inform host 10, which transmitted message 425, via message 431 that the host computing device may restart authorization.

Figure 5:
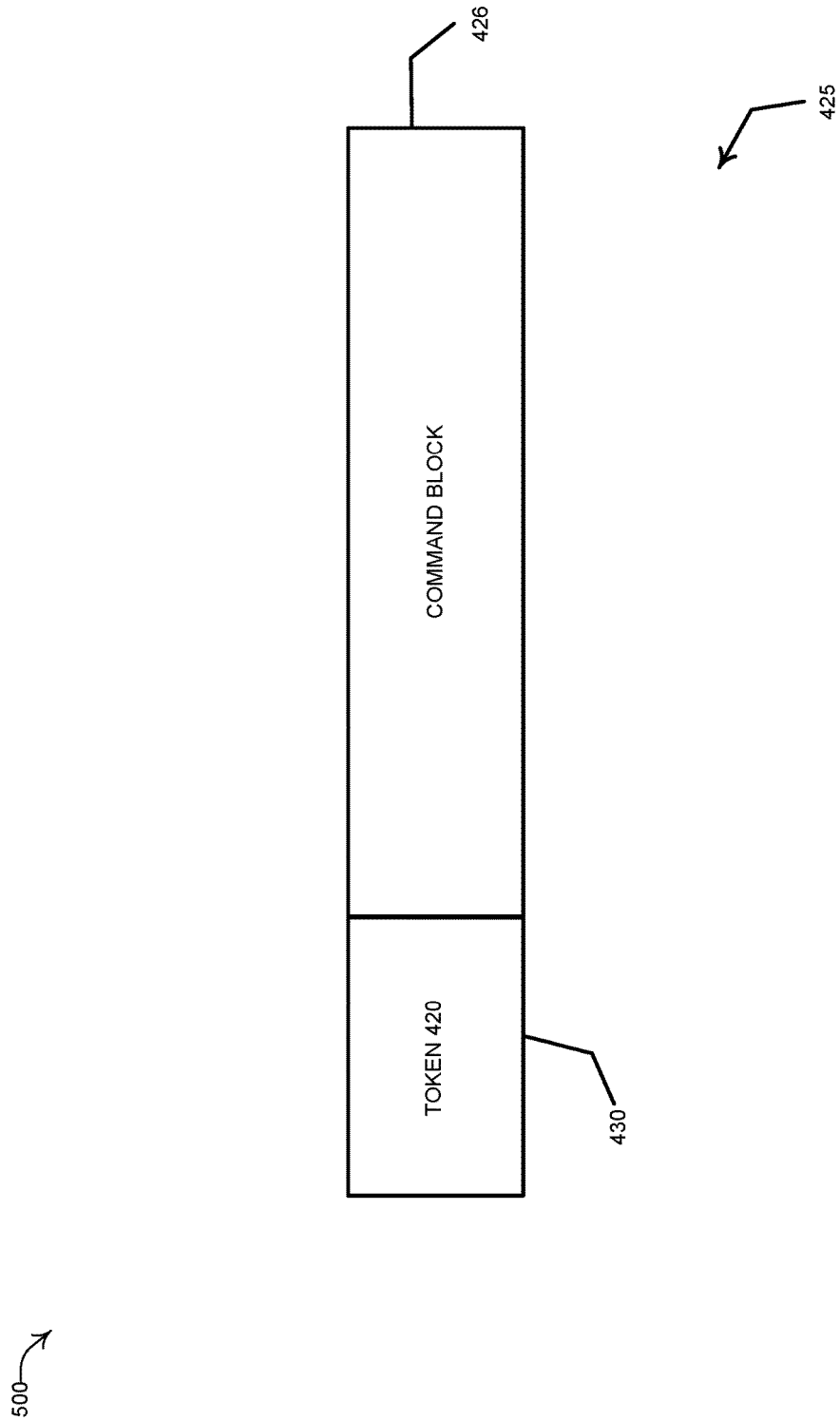
FIG. 5 illustrates an example authentication packet in a fiber channel protocol data unit.

FIG. 5 illustrates an example novel command message 425. Command message 425 may comprise a conventional CDB command block structure section 426 that may be generated according to a conventional SCSI/FCP process. Command message 425 may comprise a new block 430 that comprises a token 420, or other information described above, that may have been encrypted using a key corresponding to a storage array 12 as described in reference to FIG. 4.

Figure 6:
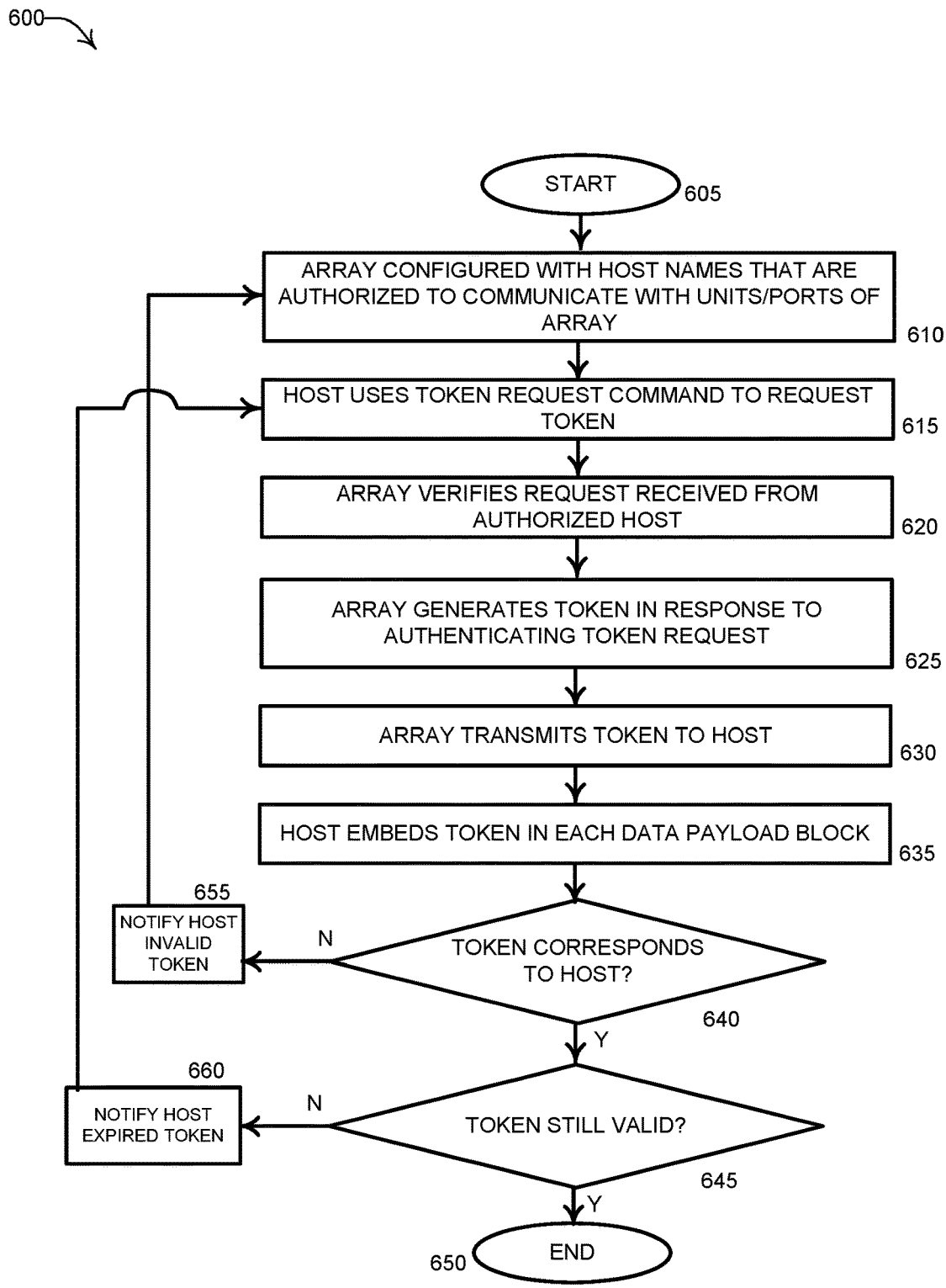
FIG. 6 illustrates a flow diagram of an example method to authenticate a fibre channel protocol data unit.

Turning now to FIG. 6, the figure illustrates a flow diagram of an example method 600 to authenticate data manipulation commands received at a storage array. Method 600 begins at act 605. At act 610, a storage array may be configured with host names, or other identifiers corresponding to host computing devices, that are authorized to communicate with units, or ports, of the storage array. The host names may be worldwide names, that may be associated uniquely with a host bus adapter corresponding to the host computing device. The configuring, or authorizing, of the host computing device to access the storage array at act 610 may comprise masking techniques. The configuration of the storage array with host names that are authorized to communicate with the storage array may be facilitated by, or implemented by, or performed by, a management console, such as management console 14 described in reference to FIG. 1.

Continuing description of FIG. 6, at act 615, a host computing device that may have been configured at act 610 to communicate with the storage array may generate and transmit to the storage array a token request command to request an authentication token. At act 620, the storage array may receive the token request command message transmitted at act 615 and may verify that the token request transmitted at act 615 and received at act 620 is received from an authorized host computing device at act 610. At act 625, the storage array may generate a token in response to the token request received at act 620. At act 630, the storage array may transmit the token to the host device that transmitted the token request at act 615.

The host computing device may receive the token transmitted at act 630, and at act 635 the host computing device may insert the token into, or embed the token into, a command message that the host computing device transmits to the storage array requesting manipulation of data or requesting other manipulation of the storage array. A command message may comprise a special token block in addition to a data block of a conventional command message. The token may be inserted into, or embedded in, the special token block. For example, token 420 may be inserted into special token block 430 of a command message 425, in addition to payload of a conventional command message block 426, as described in reference to FIG. 5.

If a determination is made at act 640 that a command message received by the storage array from a host computing device that is a host computing device configured to be authorized to access the storage array at act 610, method 600 may advance to act 645. At act 645, the storage array may determine whether the token that may be included in a special token block of the command message is valid. If a determination made it act 645 is that a command message received by a storage array from a host computing device that was configured as being authorized to access the storage array at act 610 is valid, based on the command message comprising a valid token, the storage array may perform a command that corresponds to the command message and method 600 advances to act 650 and ends.

If a determination is made at act 640 that a token received in a command message by a storage array from a host computing device does not correspond to a host computing device that was configured at act 610, method 600 may advance to act 655. At act 655, the storage array may transmit to the host computing device an unauthorized command indication message indicative to the host computing device that the token received in the command message was not received from a host computing device that was configured at act 610 as being authorized to access the storage array. Method 600 returns from act 655 to act 610 and the storage array may be reconfigured such that command messages received from the host computing device that was determined at act 645 to not have been configured as being authorized to access the storage array at the previous iteration of act 610 is now configured to access the storage array.

Returning to description act 645, if a determination is made at the storage array that, although the token received in a command message may have been received from a host computing device that was configured as being authorized to access the storage array at act 610, the token has expired, and thus is not valid, method 600 may advance to act 660. At act 660, the storage array may transmit to the host computing device an invalid token message indicative to the host computing device to request a new token, or updated token, at act 615. Accordingly, by a host computing device embedding a token generated by the storage array into every command message transmitted to the storage array, the storage array may authenticate every command it receives as being received from a host computing device that was configured as being authorized to access the storage array at act 610, thus obviating the need to use an authentication server.

Figure 7:
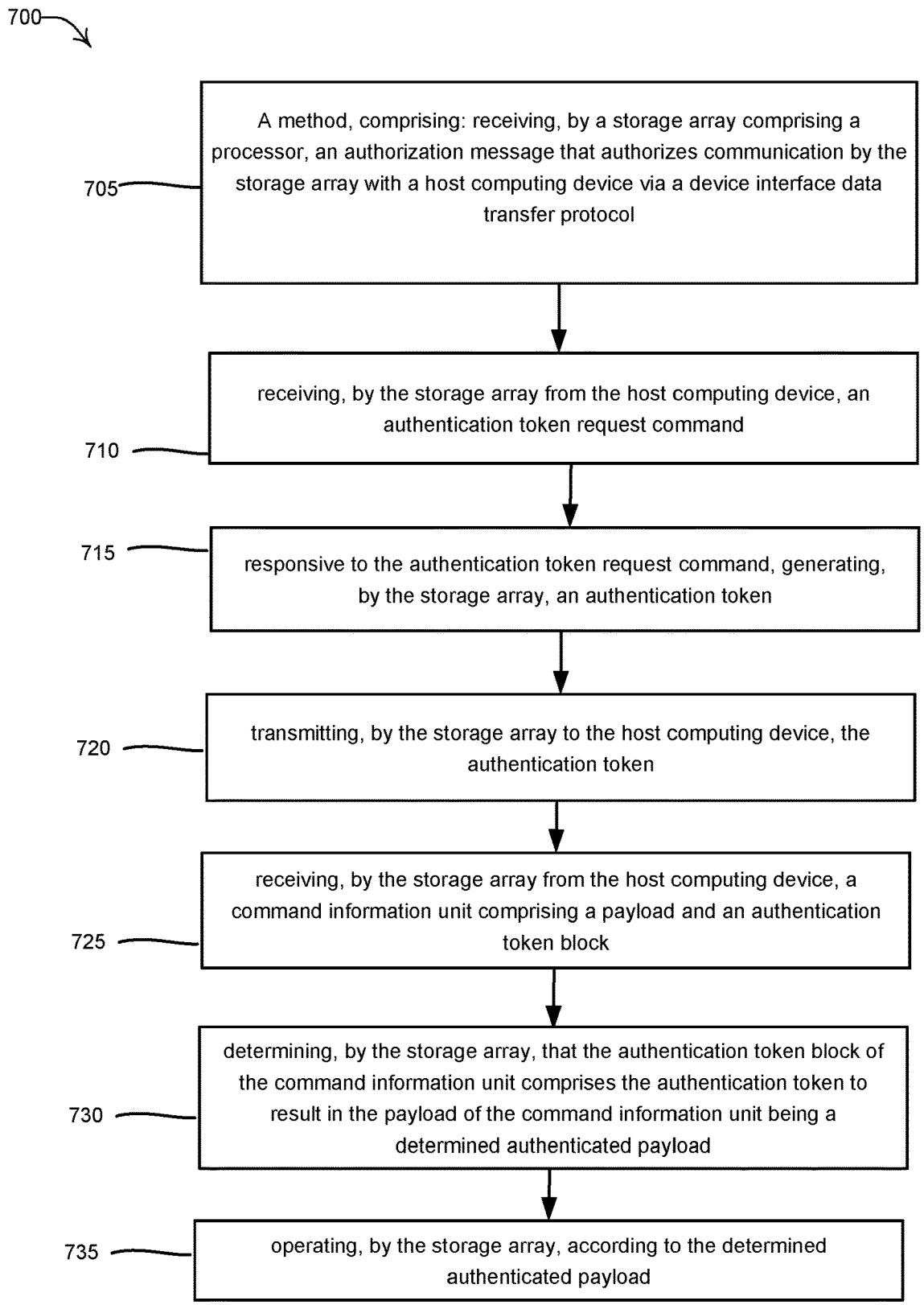
FIG. 7 illustrates an exemplary method embodiment.

Turning now to FIG. 7, the figure illustrates an example embodiment method 700, comprising, at block 705 receiving, by a storage array comprising a processor, an authorization message that authorizes communication by the storage array with a host computing device via a device interface data transfer protocol; at block 710 receiving, by the storage array from the host computing device, an authentication token request command; at block 715 responsive to the authentication token request command, generating, by the storage array, an authentication token; at block 720 transmitting, by the storage array to the host computing device, the authentication token; at block 725 receiving, by the storage array from the host computing device, a command information unit comprising a payload and an authentication token block; at block 730 determining, by the storage array, that the authentication token block of the command information unit comprises the authentication token to result in the payload of the command information unit being a determined authenticated payload; and at block 735 operating, by the storage array, according to the determined authenticated payload.

Turning now to FIG. 8, the figure illustrates an example storage array 800, comprising, at block 805 a processor, configured to receive, from a management computing component, an authorization message, corresponding to a host computing device, indicative of the host computing device being authorized to access the storage array; at block 810 receive, from the host computing device via a host bus adapter corresponding to the host computing device, an authentication request command; at block 815 responsive to the authentication request command, generate authentication information; at block 820 transmit, to the host computing device, an authentication message comprising the authentication information; at block 825 receive, from the host computing device via the host bus adapter, a command message comprising a payload and the authentication information; at block 830 determine that the authentication information corresponding to the command message is the same as the authentication information transmitted in the authentication message to result in the payload being an authenticated payload; and at block 835 based on the payload being determined to be the authenticated payload, perform an act according to the authenticated payload.

Figure 9:
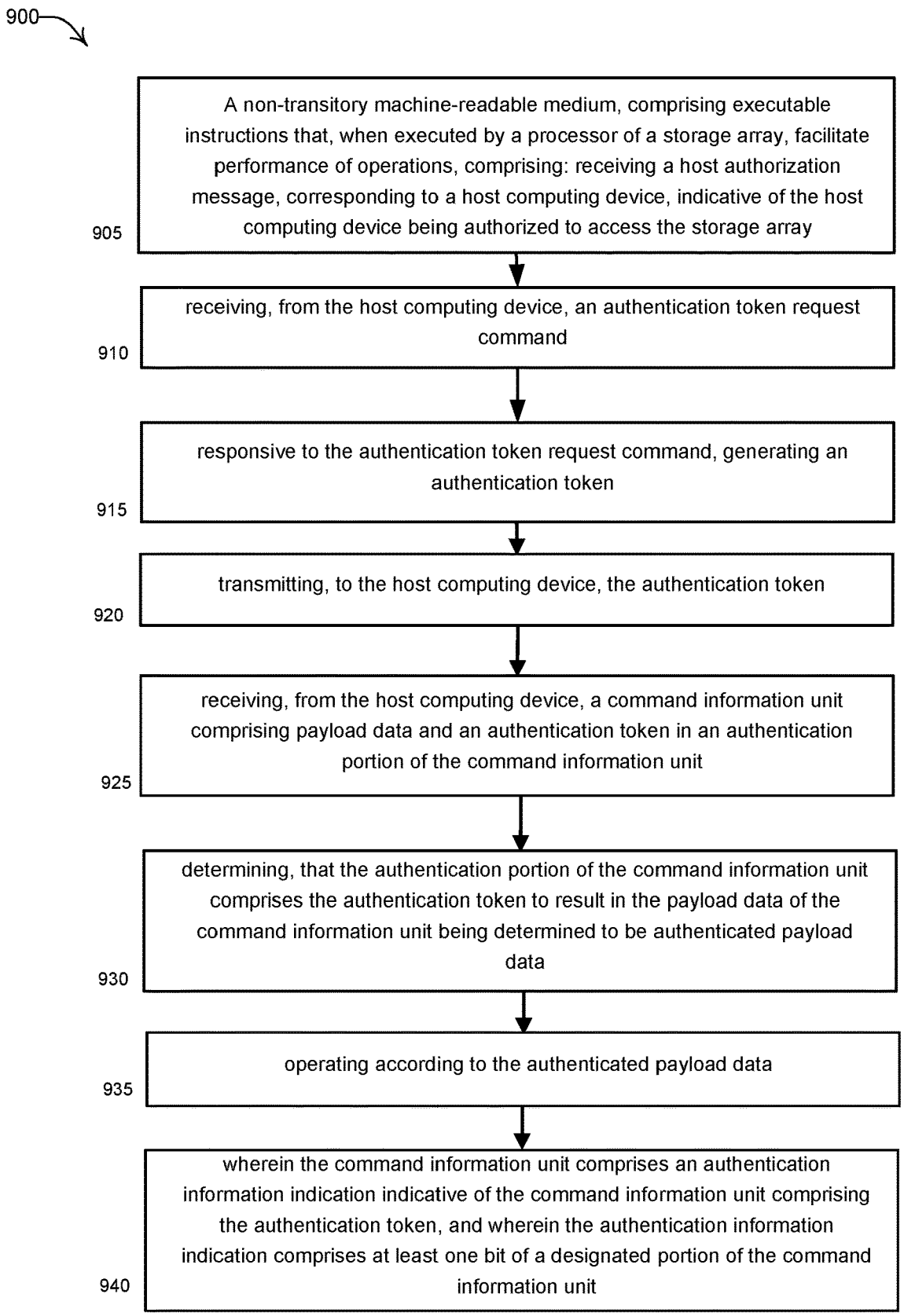
FIG. 9 illustrates an exemplary non-transitory machine-readable medium embodiment.

Turning now to FIG. 9 the figure illustrates an example non-transitory machine-readable medium 900, comprising executable instructions that, when executed by a processor of a storage array, facilitate performance of operations, comprising at block 905 receiving a host authorization message, corresponding to a host computing device, indicative of the host computing device being authorized to access the storage array; at block 910 receiving, from the host computing device, an authentication token request command; at block 915 responsive to the authentication token request command, generating an authentication token; at block 920 transmitting, to the host computing device, the authentication token; at block 925 receiving, from the host computing device, a command information unit comprising payload data and an authentication token in an authentication portion of the command information unit; at block 930 determining, that the authentication portion of the command information unit comprises the authentication token to result in the payload data of the command information unit being determined to be authenticated payload data; at block 935 operating according to the authenticated payload data; and at block 940 wherein the command information unit comprises an authentication information indication indicative of the command information unit comprising the authentication token, and wherein the authentication information indication comprises at least one bit of a designated portion of the command information unit.

In order to provide a context for the various aspects of the disclosed subject matter, the following discussion is intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or non-volatile memory, or can comprise both volatile and non-volatile memory, for example, by way of illustration, and not limitation, volatile memory 1020 (see below), non-volatile memory 1022 (see below), disk storage 1024 (see below), and memory storage, e.g., local data store(s) 1030 and remote data store(s) 1050, see below. Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 10:
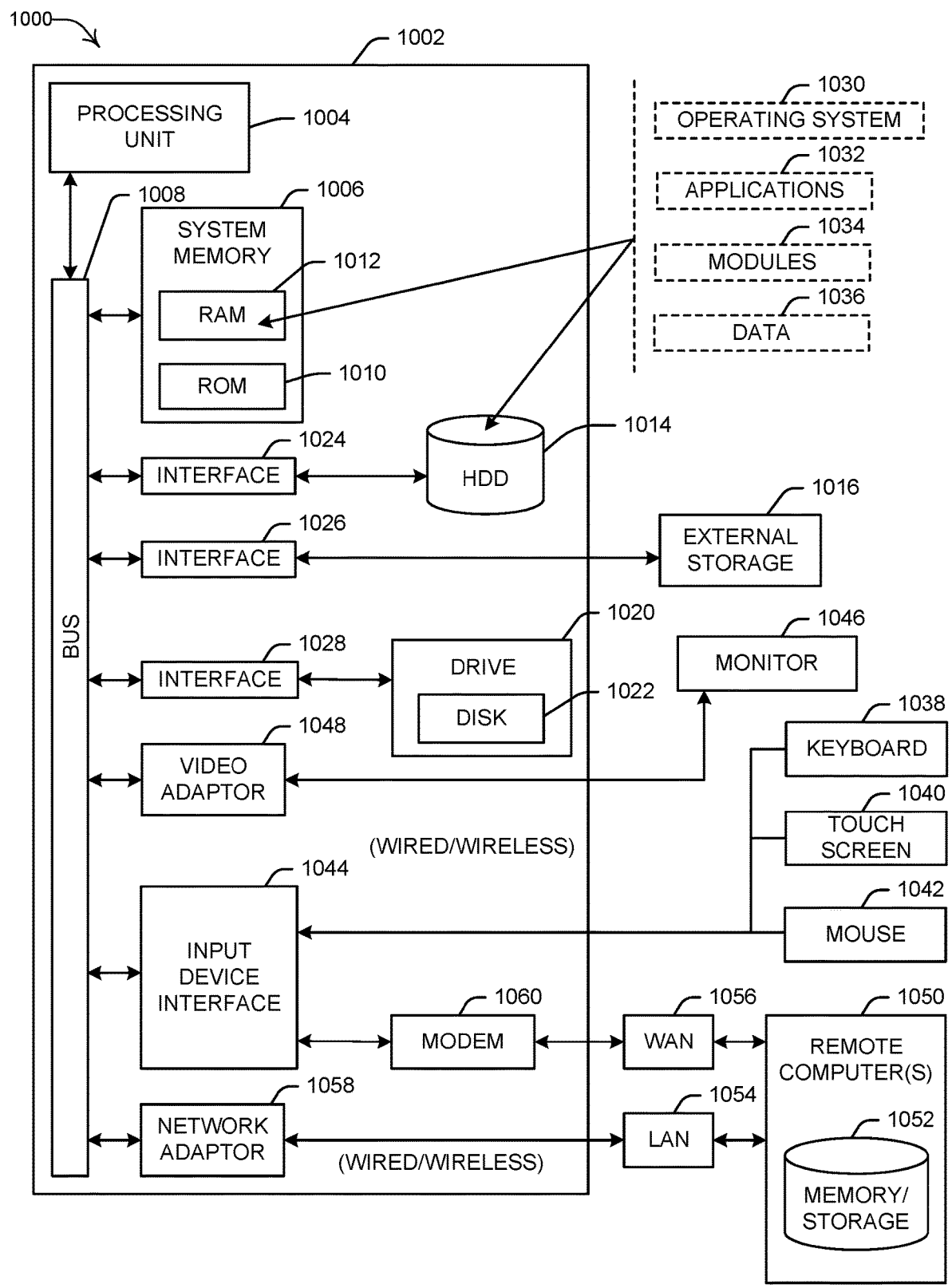
FIG. 10 illustrates an example block diagram of a computer operable to execute an embodiment of this disclosure.

Referring now to FIG. 10, in order to provide additional context for various embodiments described herein, FIG. 10 and the following discussion are intended to provide a brief, general description of a suitable computing environment 1000 in which the various embodiments described herein can be implemented.

While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching. charging, service invocation, or gateways. Aggregation can refer to the highest level of aggregation in a service provider network wherein the next level in the hierarchy under the core nodes is the distribution networks and then the edge networks. User equipment does not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving, by a storage array comprising a processor, an authorization message that authorizes communication by the storage array with a host computing device via a device interface data transfer protocol;
   receiving, by the storage array from the host computing device, an authentication token request command;
   responsive to the authentication token request command, generating, by the storage array, an authentication token;
   transmitting, by the storage array to the host computing device, the authentication token;
   receiving, by the storage array from the host computing device, a command information unit comprising a payload and an authentication token block;
   determining, by the storage array, that the authentication token block of the command information unit comprises the authentication token to result in the payload of the command information unit being a determined authenticated payload; and
   operating, by the storage array, according to the determined authenticated payload.

2. The method of claim 1, wherein the device interface data transfer protocol is Small Computer System Interface protocol.

3. The method of claim 1, wherein the device interface data transfer protocol is Fibre Channel Protocol.

4. The method of claim 1, wherein the authentication token is a Json Web Token.

5. The method of claim 1, wherein the determined authenticated payload comprises a command, and wherein the operating according to the determined authenticated payload comprises performing an action corresponding to the command.

6. The method of claim 1, wherein the authentication token comprises an expiration indication indicative of an expiration of the authentication token, and the method further comprising:
   analyzing, by the storage array, the expiration with respect to a current time; and
   determining, by the storage array, that the current time is later than the expiration to result in a determined expired authentication token,
   wherein the operating according to the determined authenticated payload comprises transmitting a notification indication indicative to the host computing device to transmit to the storage array a new authentication token request command requesting a new authentication token.

7. The method of claim 1, wherein the authorization message is a result of a logical unit number masking process.

8. The method of claim 1, wherein the authorization message is generated by a host management console.

9. The method of claim 1, wherein the authorization message is received from a management computing component, and wherein the management computing component is configured to manage the storage array and a host bus adapter, corresponding to the host computing device, via a private computing network.

10. The method of claim 1, wherein the host computing device comprises a host bus adapter, and wherein the authorization message comprises a worldwide name corresponding to the host bus adapter.

11. The method of claim 1, wherein the command information unit comprises an authentication token block indication indicative of the command information unit comprising the authentication token block.

12. The method of claim 11, wherein the authentication token block indication comprises at least one bit of a vendor-specific portion of the command information unit.

13. A storage array, comprising:
   a processor configured to:
   receive, from a management computing component, an authorization message, corresponding to a host computing device, indicative of the host computing device being authorized to access the storage array;
   receive, from the host computing device via a host bus adapter corresponding to the host computing device, an authentication request command;
   responsive to the authentication request command, generate authentication information;

transmit, to the host computing device, an authentication message comprising the authentication information;

receive, from the host computing device via the host bus adapter, a command message comprising a payload and the authentication information;

determine that the authentication information corresponding to the command message is the same as the authentication information transmitted in the authentication message to result in the payload being an authenticated payload; and based on the payload being determined to be the authenticated payload, perform an act according to the authenticated payload.

14. The storage array of claim 13, wherein the authenticated payload comprises a command, and wherein performance of the act according to the authenticated payload comprises performing an action corresponding to the command.

15. The storage array of claim 13, wherein the payload comprises an authentication information indication indicative of the payload comprising the authentication information.

16. The storage array of claim 15, wherein the authentication information indication comprises at least one bit of a vendor-specific portion of the command message.

17. A non-transitory machine-readable medium, comprising executable instructions that, when executed by a processor of a storage array, facilitate performance of operations, comprising:

receiving a host authorization message, corresponding to a host computing device, indicative of the host computing device being authorized to access the storage array;

receiving, from the host computing device, an authentication token request command;

responsive to the authentication token request command, generating an authentication token;

transmitting, to the host computing device, the authentication token;

receiving, from the host computing device, a command information unit comprising payload data and an authentication token in an authentication portion of the command information unit;

determining that the authentication portion of the command information unit comprises the authentication token to result in the payload data of the command information unit being determined to be authenticated payload data; and operating according to the authenticated payload data.

18. The non-transitory machine-readable medium of claim 17, wherein the command information unit comprises an authentication information indication indicative of the command information unit comprising the authentication token, and wherein the authentication information indication comprises at least one bit of a designated portion of the command information unit.

19. The non-transitory machine-readable medium of claim 17, wherein the management computing component corresponds to a computing network that comprises the storage array.

20. The non-transitory machine-readable medium of claim 17, wherein the authentication token comprises an expiration indication indicative of an expiration of the authentication token, and wherein the operations further comprise:

analyzing the expiration with respect to a current time to result in an analyzed expiration; and determining, based on the analyzed expiration, that the authentication token has expired, wherein the operating according to the authenticated payload data comprises transmitting a reauthentication indication indicative to the host computing device to transmit to the storage array a new authentication token request command requesting a new authentication token.

* * * * *